(12) United States Patent
Turton et al.

(10) Patent No.: US 12,551,379 B2
(45) Date of Patent: Feb. 17, 2026

(54) ADVANCED DIGIT DRESSING

(71) Applicant: SYSTAGENIX WOUND MANAGEMENT, LIMITED, West Sussex (GB)

(72) Inventors: Kyle Turton, West Sussex (GB); Daniel Parker, West Sussex (GB); Saul Di Palo, West Sussex (GB); Katie Bourdillon, Leeds (GB); Alexander Waite, Keighley (GB); Sally Stephens, Skipton (GB)

(73) Assignee: Systagenix Wound Management, Limited, Bracknell (GB)

( * ) Notice: Subject to any disclaimer, the term of this patent is extended or adjusted under 35 U.S.C. 154(b) by 625 days.

(21) Appl. No.: 17/429,545

(22) PCT Filed: Feb. 13, 2020

(86) PCT No.: PCT/IB2020/051214
§ 371 (c)(1),
(2) Date: Aug. 9, 2021

(87) PCT Pub. No.: WO2020/170089
PCT Pub. Date: Aug. 27, 2020

(65) Prior Publication Data
US 2022/0133544 A1    May 5, 2022

Related U.S. Application Data

(60) Provisional application No. 62/807,551, filed on Feb. 19, 2019.

(51) Int. Cl.
*A61F 13/00* (2024.01)
*A61F 13/01* (2024.01)
(Continued)

(52) U.S. Cl.
CPC .. *A61F 13/00063* (2013.01); *A61F 13/00995* (2013.01); *A61F 13/01029* (2024.01);
(Continued)

(58) Field of Classification Search
CPC ............ A61F 13/0063; A61F 13/00995; A61F 13/01029; A61F 13/01042;
(Continued)

(56) References Cited

U.S. PATENT DOCUMENTS

| | | |
|---|---|---|
| 1,355,846 A | 10/1920 | Rannells |
| 2,547,758 A | 4/1951 | Keeling |

(Continued)

FOREIGN PATENT DOCUMENTS

| | | |
|---|---|---|
| AU | 650575 B2 | 3/1986 |
| AU | 745271 B2 | 3/2002 |

(Continued)

OTHER PUBLICATIONS

WO 2016047981 A1 Translation (Year: 2015).*

(Continued)

*Primary Examiner* — Catharine L Anderson
*Assistant Examiner* — Hans Kaliher

(57) ABSTRACT

A dressing for treating a wound on a digit includes a digit contact layer configured to substantially prevent adherence of the dressing to the wound and an antimicrobial layer coupled to a wound-facing side of the digit contact layer. The antimicrobial layer includes an antimicrobial substance. A first roll is coupled to a non-wound-facing side of the digit contact layer and unrollable to cover the digit, the digit contact layer, and the antimicrobial layer and a second roll is coupled to the first roll and unrollable to cover the first roll, the digit, the digit contact layer, and the antimicrobial layer.

15 Claims, 4 Drawing Sheets

(51) Int. Cl.
  *A61F 13/06* (2006.01)
  *A61F 13/10* (2006.01)
  *A61K 47/59* (2017.01)
  *A61L 15/22* (2006.01)
  *A61L 15/32* (2006.01)
  *A61L 15/44* (2006.01)

(52) U.S. Cl.
  CPC ...... *A61F 13/01042* (2024.01); *A61F 13/068* (2013.01); *A61F 13/105* (2013.01); *A61K 47/59* (2017.08); *A61L 15/225* (2013.01); *A61L 15/32* (2013.01); *A61L 15/44* (2013.01); *A61F 2013/00217* (2013.01); *A61F 2013/00285* (2013.01); *A61L 2300/216* (2013.01); *A61L 2300/404* (2013.01)

(58) Field of Classification Search
  CPC . A61F 2013/00217; A61F 2013/00285; A61L 15/44
  See application file for complete search history.

(56) References Cited

U.S. PATENT DOCUMENTS

| | | | |
|---|---|---|---|
| 2,632,443 | A | 3/1953 | Lesher |
| 2,682,873 | A | 7/1954 | Evans et al. |
| 2,785,677 | A * | 3/1957 | Stumpf ............... A61F 13/0206 602/58 |
| 2,823,672 | A * | 2/1958 | Schladermundt ... A61F 13/0203 602/57 |
| 2,910,763 | A | 11/1959 | Lauterbach |
| 2,969,057 | A | 1/1961 | Simmons |
| 3,066,672 | A | 12/1962 | Crosby, Jr. et al. |
| 3,263,682 | A * | 8/1966 | Rosenfield ............ A61F 13/105 2/21 |
| 3,367,332 | A | 2/1968 | Groves |
| 3,520,300 | A | 7/1970 | Flower, Jr. |
| 3,568,675 | A | 3/1971 | Harvey |
| 3,648,692 | A | 3/1972 | Wheeler |
| 3,682,180 | A | 8/1972 | McFarlane |
| 3,826,254 | A | 7/1974 | Mellor |
| 4,080,970 | A | 3/1978 | Miller |
| 4,096,853 | A | 6/1978 | Weigand |
| 4,139,004 | A | 2/1979 | Gonzalez, Jr. |
| 4,165,748 | A | 8/1979 | Johnson |
| 4,184,510 | A | 1/1980 | Murry et al. |
| 4,233,969 | A | 11/1980 | Lock et al. |
| 4,245,630 | A | 1/1981 | Lloyd et al. |
| 4,256,109 | A | 3/1981 | Nichols |
| 4,261,363 | A | 4/1981 | Russo |
| 4,275,721 | A | 6/1981 | Olson |
| 4,284,079 | A | 8/1981 | Adair |
| 4,297,995 | A | 11/1981 | Golub |
| 4,333,468 | A | 6/1982 | Geist |
| 4,373,519 | A | 2/1983 | Errede et al. |
| 4,382,441 | A | 5/1983 | Svedman |
| 4,392,853 | A | 7/1983 | Muto |
| 4,392,858 | A | 7/1983 | George et al. |
| 4,419,097 | A | 12/1983 | Rowland |
| 4,465,485 | A | 8/1984 | Kashmer et al. |
| 4,475,909 | A | 10/1984 | Eisenberg |
| 4,480,638 | A | 11/1984 | Schmid |
| 4,525,166 | A | 6/1985 | Leclerc |
| 4,525,374 | A | 6/1985 | Vaillancourt |
| 4,540,412 | A | 9/1985 | Van Overloop |
| 4,543,100 | A | 9/1985 | Brodsky |
| 4,548,202 | A | 10/1985 | Duncan |
| 4,551,139 | A | 11/1985 | Plaas et al. |
| 4,569,348 | A | 2/1986 | Hasslinger |
| 4,605,399 | A | 8/1986 | Weston et al. |
| 4,608,041 | A | 8/1986 | Nielsen |
| 4,640,688 | A | 2/1987 | Hauser |
| 4,655,209 | A * | 4/1987 | Scott ..................... A61F 15/005 602/42 |
| 4,655,754 | A | 4/1987 | Richmond et al. |
| 4,664,662 | A | 5/1987 | Webster |
| 4,710,165 | A | 12/1987 | McNeil et al. |
| 4,733,659 | A | 3/1988 | Edenbaum et al. |
| 4,743,232 | A | 5/1988 | Kruger |
| 4,758,220 | A | 7/1988 | Sundblom et al. |
| 4,787,888 | A | 11/1988 | Fox |
| 4,826,494 | A | 5/1989 | Richmond et al. |
| 4,838,883 | A | 6/1989 | Matsuura |
| 4,840,187 | A | 6/1989 | Brazier |
| 4,863,449 | A | 9/1989 | Therriault et al. |
| 4,872,450 | A | 10/1989 | Austad |
| 4,878,901 | A | 11/1989 | Sachse |
| 4,897,081 | A | 1/1990 | Poirier et al. |
| 4,906,233 | A | 3/1990 | Moriuchi et al. |
| 4,906,240 | A | 3/1990 | Reed et al. |
| 4,919,654 | A | 4/1990 | Kalt |
| 4,926,851 | A * | 5/1990 | Bulley ..................... D04B 1/18 602/76 |
| 4,941,882 | A | 7/1990 | Ward et al. |
| 4,953,565 | A | 9/1990 | Tachibana et al. |
| 4,969,880 | A | 11/1990 | Zamierowski |
| 4,985,019 | A | 1/1991 | Michelson |
| 5,037,397 | A | 8/1991 | Kalt et al. |
| 5,086,170 | A | 2/1992 | Luheshi et al. |
| 5,092,858 | A | 3/1992 | Benson et al. |
| 5,100,396 | A | 3/1992 | Zamierowski |
| 5,134,994 | A | 8/1992 | Say |
| 5,149,331 | A | 9/1992 | Ferdman et al. |
| 5,167,613 | A | 12/1992 | Karami et al. |
| 5,176,663 | A | 1/1993 | Svedman et al. |
| 5,215,522 | A | 6/1993 | Page et al. |
| 5,232,453 | A | 8/1993 | Plass et al. |
| 5,261,893 | A | 11/1993 | Zamierowski |
| 5,278,100 | A | 1/1994 | Doan et al. |
| 5,279,550 | A | 1/1994 | Habib et al. |
| 5,298,015 | A | 3/1994 | Komatsuzaki et al. |
| 5,342,376 | A | 8/1994 | Ruff |
| 5,344,415 | A | 9/1994 | DeBusk et al. |
| 5,358,494 | A | 10/1994 | Svedman |
| 5,437,622 | A | 8/1995 | Carion |
| 5,437,651 | A | 8/1995 | Todd et al. |
| 5,499,966 | A * | 3/1996 | Bulley ................... A61F 13/06 602/41 |
| 5,512,041 | A * | 4/1996 | Bogart .................. A61F 13/023 602/56 |
| 5,527,293 | A | 6/1996 | Zamierowski |
| 5,538,500 | A * | 7/1996 | Peterson ............... A61F 13/062 602/54 |
| 5,549,584 | A | 8/1996 | Gross |
| 5,556,375 | A | 9/1996 | Ewall |
| 5,607,388 | A | 3/1997 | Ewall |
| 5,636,643 | A | 6/1997 | Argenta et al. |
| 5,645,081 | A | 7/1997 | Argenta et al. |
| 6,071,267 | A | 6/2000 | Zamierowski |
| 6,135,116 | A | 10/2000 | Vogel et al. |
| 6,241,747 | B1 | 6/2001 | Ruff |
| 6,274,787 | B1 * | 8/2001 | Downing ............... A61F 15/008 602/14 |
| 6,287,316 | B1 | 9/2001 | Agarwal et al. |
| 6,345,623 | B1 | 2/2002 | Heaton et al. |
| 6,384,295 | B2 * | 5/2002 | Wehde ................. A61F 13/0226 602/41 |
| 6,488,643 | B1 | 12/2002 | Tumey et al. |
| 6,493,568 | B1 | 12/2002 | Bell et al. |
| 6,553,998 | B2 | 4/2003 | Heaton et al. |
| 6,593,508 | B1 * | 7/2003 | Harder ..................... A61F 13/00 602/56 |
| 6,814,079 | B2 | 11/2004 | Heaton et al. |
| 7,173,161 | B1 * | 2/2007 | Kandt .................... A61F 13/06 602/61 |
| 7,612,248 | B2 * | 11/2009 | Burton .................... A61L 15/42 602/42 |
| 7,780,615 | B1 * | 8/2010 | Shesol .................. A61F 13/105 602/22 |
| 7,846,141 | B2 | 12/2010 | Weston |
| 8,062,273 | B2 | 11/2011 | Weston |
| 8,216,198 | B2 | 7/2012 | Heagle et al. |

(56) References Cited

U.S. PATENT DOCUMENTS

| | | | |
|---|---|---|---|
| 8,251,979 | B2 | 8/2012 | Malhi |
| 8,257,327 | B2 | 9/2012 | Blott et al. |
| 8,398,614 | B2 | 3/2013 | Blott et al. |
| 8,449,509 | B2 | 5/2013 | Weston |
| 8,529,548 | B2 | 9/2013 | Blott et al. |
| 8,535,296 | B2 | 9/2013 | Blott et al. |
| 8,551,060 | B2 | 10/2013 | Schuessler et al. |
| 8,568,386 | B2 | 10/2013 | Malhi |
| 8,679,081 | B2 | 3/2014 | Heagle et al. |
| 8,834,451 | B2 | 9/2014 | Blott et al. |
| 8,926,592 | B2 | 1/2015 | Blott et al. |
| 9,017,302 | B2 | 4/2015 | Vitaris et al. |
| 9,198,801 | B2 | 12/2015 | Weston |
| 9,198,803 | B1 * | 12/2015 | London ............... A61F 13/0203 |
| 9,211,365 | B2 | 12/2015 | Weston |
| 9,289,542 | B2 | 3/2016 | Blott et al. |
| 9,572,968 | B2 * | 2/2017 | Dorian .................. A61M 37/00 |
| 9,764,055 | B2 * | 9/2017 | Von Wolff .......... A61F 13/0209 |
| 10,172,748 | B1 * | 1/2019 | Wanderman .......... A61F 15/005 |
| 2002/0077661 | A1 | 6/2002 | Saadat |
| 2002/0115951 | A1 | 8/2002 | Norstrem et al. |
| 2002/0120185 | A1 | 8/2002 | Johnson |
| 2002/0143286 | A1 | 10/2002 | Tumey |
| 2013/0131621 | A1 * | 5/2013 | Van Holten ............. A61L 15/46 |
| | | | 514/723 |
| 2014/0163491 | A1 | 6/2014 | Schuessler et al. |
| 2015/0080788 | A1 | 3/2015 | Blott et al. |
| 2017/0105877 | A1 * | 4/2017 | Buteux ................. A61F 13/068 |
| 2022/0110798 | A1 * | 4/2022 | Owen ................. A61F 13/0206 |

FOREIGN PATENT DOCUMENTS

| | | | |
|---|---|---|---|
| AU | 755496 B2 | 12/2002 | |
| CA | 2005436 A1 | 6/1990 | |
| DE | 26 40 413 A1 | 3/1978 | |
| DE | 43 06 478 A1 | 9/1994 | |
| DE | 29 504 378 U1 | 9/1995 | |
| EP | 0100148 A1 | 2/1984 | |
| EP | 0117632 A2 | 9/1984 | |
| EP | 0161865 A2 | 11/1985 | |
| EP | 0358302 A2 | 3/1990 | |
| EP | 1018967 A1 | 7/2000 | |
| EP | 1 374 813 A2 | 1/2004 | |
| EP | 2 572 737 A1 | 3/2013 | |
| EP | 2 856 987 A1 | 4/2015 | |
| GB | 692578 A | 6/1953 | |
| GB | 2 195 255 A | 4/1988 | |
| GB | 2 197 789 A | 6/1988 | |
| GB | 2 220 357 A | 1/1990 | |
| GB | 2 235 877 A | 3/1991 | |
| GB | 2 329 127 A | 3/1999 | |
| GB | 2 333 965 A | 8/1999 | |
| JP | 4129536 B2 | 8/2008 | |
| SG | 71559 | 4/2002 | |
| WO | 80/02182 A1 | 10/1980 | |
| WO | 87/04626 A1 | 8/1987 | |
| WO | 90/010424 A1 | 9/1990 | |
| WO | 93/009727 A1 | 5/1993 | |
| WO | 94/020041 A1 | 9/1994 | |
| WO | 96/05873 A1 | 2/1996 | |
| WO | 97/18007 A1 | 5/1997 | |
| WO | 99/13793 A1 | 3/1999 | |
| WO | WO-2016047981 A1 * | 3/2016 | ............. A61F 13/02 |

OTHER PUBLICATIONS

International Search Report and Written Opinion on International Patent Application No. PCT/IB2020/051214 dated Apr. 28, 2020 (9 pages).

Louis C. Argenta, MD and Michael J. Morykwas, PHD; Vacuum-Assisted Closure: A New Method for Wound Control and Treatment: Clinical Experience; Annals of Plastic Surgery; vol. 38, No. 6, Jun. 1997; pp. 563-576.

Susan Mendez-Eatmen, RN; "When wounds Won't Heal" RN Jan. 1998, vol. 61 (1); Medical Economics Company, Inc., Montvale, NJ, USA; pp. 20-24.

James H. Blackburn II, MD et al.: Negative-Pressure Dressings as a Bolster for Skin Grafts; Annals of Plastic Surgery, vol. 40, No. 5, May 1998, pp. 453-457; Lippincott Williams & Wilkins, Inc., Philidelphia, PA, USA.

John Masters; "Reliable, Inexpensive and Simple Suction Dressings"; Letter to the Editor, British Journal of Plastic Surgery, 1998, vol. 51 (3), p. 267; Elsevier Science/The British Association of Plastic Surgeons, UK.

S.E. Greer, et al. "The Use of Subatmospheric Pressure Dressing Therapy to Close Lymphocutaneous Fistulas of the Groin" British Journal of Plastic Surgery (2000), 53, pp. 484-487.

George V. Letsou, MD., et al.; "Stimulation of Adenylate Cyclase Activity in Cultured Endothelial Cells Subjected to Cyclic Stretch"; Journal of Cardiovascular Surgery, 31, 1990, pp. 634-639.

Orringer, Jay, et al; "Management of Wounds in Patients with Complex Enterocutaneous Fistulas"; Surgery, Gynecology & Obstetrics, Jul. 1987, vol. 165, pp. 79-80.

International Search Report for PCT International Application PCT/GB95/01983; Nov. 23, 1995.

PCT International Search Report for PCT International Application PCT/GB98/02713; Jan. 8, 1999.

PCT Written Opinion; PCT International Application PCT/GB98/02713; Jun. 8, 1999.

PCT International Examination and Search Report, PCT International Application PCT/GB96/02802; Jan. 15, 1998 & Apr. 29, 1997.

PCT Written Opinion, PCT International Application PCT/GB96/02802; Sep. 3, 1997.

Dattilo, Philip P., Jr., et al; "Medical Textiles: Application of an Absorbable Barbed Bi-directional Surgical Suture"; Journal of Textile and Apparel, Technology and Management, vol. 2, Issue 2, Spring 2002, pp. 1-5.

Kostyuchenok, B.M., et al; "Vacuum Treatment in the Surgical Management of Purulent Wounds"; Vestnik Khirurgi, Sep. 1986, pp. 18-21 and 6 page English translation thereof.

Davydov, Yu. A., et al; "Vacuum Therapy in the Treatment of Purulent Lactation Mastitis"; Vestnik Khirurgi, May 14, 1986, pp. 66-70, and 9 pages English translation thereof.

Yusupov. Yu.N., et al; "Active Wound Drainage", Vestnki Khirurgi, vol. 138, Issue 4, 1987, and 7 page English translation thereof.

Davydov, Yu.A., et al; "Bacteriological and Cytological Assessment of Vacuum Therapy for Purulent Wounds"; Vestnik Khirugi, Oct. 1988, pp. 48-52, and 8 page English translation thereof.

Davydov, Yu.A., et al; "Concepts for the Clinical-Biological Management of the Wound Process in the Treatment of Purulent Wounds by Means of Vacuum Therapy"; Vestnik Khirurgi, Jul. 7, 1980, pp. 132-136, and 8 page English translation thereof.

Chariker, Mark E., M.D., et al; "Effective Management of incisional and cutaneous fistulae with closed suction wound drainage"; Contemporary Surgery, vol. 34, Jun. 1989, pp. 59-63.

Egnell Minor, Instruction Book, First Edition, 300 7502, Feb. 1975, pp. 24.

Egnell Minor: Addition to the Users Manual Concerning Overflow Protection—Concerns all Egnell Pumps, Feb. 3, 1983, pp. 2.

Svedman, P.: "Irrigation Treatment of Leg Ulcers", The Lancet, Sep. 3, 1983, pp. 532-534.

Chinn, Steven D. et al.: "Closed Wound Suction Drainage", The Journal of Foot Surgery, vol. 24, No. 1, 1985, pp. 76-81.

Arnljots, Björn et al.: "Irrigation Treatment in Split-Thickness Skin Grafting of Intractable Leg Ulcers", Scand J. Plast Reconstr. Surg., No. 19, 1985, pp. 211-213.

Svedman, P.: "A Dressing Allowing Continuous Treatment of a Biosurface", IRCS Medical Science: Biomedical Technology, Clinical Medicine, Surgery and Transplantation, vol. 7, 1979, p. 221.

Svedman, P. et al: "A Dressing System Providing Fluid Supply and Suction Drainage Used for Continuous of Intermittent Irrigation", Annals of Plastic Surgery, vol. 17, No. 2, Aug. 1986, pp. 125-133.

N.A. Bagautdinov, "Variant of External Vacuum Aspiration in the Treatment of Purulent Diseases of Soft Tissues," Current Problems in Modern Clinical Surgery: Interdepartmental Collection, edited by

(56) References Cited

OTHER PUBLICATIONS

V. Ye Volkov et al. (Chuvashia State University, Cheboksary, U.S.S.R. 1986); pp. 94-96 (copy and certified translation).
K.F. Jeter, T.E. Tintle, and M. Chariker, "Managing Draining Wounds and Fistulae: New and Established Methods," Chronic Wound Care, edited by D. Krasner (Health Management Publications, Inc., King of Prussia, PA 1990), pp. 240-246.
G. Živadinovi?, V. ?uki?, Ž. Maksimovi?, ?. Radak, and P. Peška, "Vacuum Therapy in the Treatment of Peripheral Blood Vessels," Timok Medical Journal 11 (1986), pp. 161-164 (copy and certified translation).
F.E. Johnson, "An Improved Technique for Skin Graft Placement Using a Suction Drain," Surgery, Gynecology, and Obstetrics 159 (1984), pp. 584-585.
A.A. Safronov, Dissertation Abstract, Vacuum Therapy of Trophic Ulcers of the Lower Leg with Simultaneous Autoplasty of the Skin (Central Scientific Research Institute of Traumatology and Orthopedics, Moscow, U.S.S.R. 1967) (copy and certified translation).
M. Schein, R. Saadia, J.R. Jamieson, and G.A.G. Decker, "The 'Sandwich Technique' in the Management of the Open Abdomen," British Journal of Surgery 73 (1986), pp. 369-370.
D.E. Tribble, An Improved Sump Drain-Irrigation Device of Simple Construction, Archives of Surgery 105 (1972) pp. 511-513.
M.J. Morykwas, L.C. Argenta, E.I. Shelton-Brown, and W. McGuirt, "Vacuum-Assisted Closure: A New Method for Wound Control and Treatment: Animal Studies and Basic Foundation," Annals of Plastic Surgery 38 (1997), pp. 553-562 (Morykwas I).
C.E. Tennants, "The Use of Hypermia in the Postoperative Treatment of Lesions of the Extremities and Thorax," Journal of the American Medical Association 64 (1915), pp. 1548-1549.
Selections from W. Meyer and V. Schmieden, Bier's Hyperemic Treatment in Surgery, Medicine, and the Specialties: A Manual of its Practical Application, (W.B. Saunders Co., Philadelphia, PA 1909), pp. 17-25, 44-64, 90-96, 167-170, and 210-211.
V.A. Solovev et al., Guidelines, The Method of Treatment of Immature External Fistulas in the Upper Gastrointestinal Tract, editor-in-chief Prov. V.I. Parahonyak (S.M. Kirov Gorky State Medical Institute, Gorky, U.S.S.R. 1987) ("Solovev Guidelines").
V.A. Kuznetsov & N.a. Bagautdinov, "Vacuum and Vacuum-Sorption Treatment of Open Septic Wounds," in II All-Union Conference on Wounds and Wound Infections: Presentation Abstracts, edited by B.M. Kostyuchenok et al. (Moscow, U.S.S.R. Oct. 28-29, 1986) pp. 91-92 ("Bagautdinov II").
V.A. Solovev, Dissertation Abstract, Treatment and Prevention of Suture Failures after Gastric Resection (S.M. Kirov Gorky State Medical Institute, Gorky, U.S.S.R. 1988) ("Solovev Abstract").
V.A.C. ® Therapy Clinical Guidelines: A Reference Source for Clinicians; Jul. 2007.

\* cited by examiner

ADVANCED DIGIT DRESSING

CROSS-REFERENCE TO RELATED APPLICATIONS

This application is a US national phase application under 35 USC § 371 of International Application No. PCT/IB2020/051214 filed on Feb. 13, 2020, which claims the benefit of priority to U.S. Provisional Application No. 62/807,551, entitled "ADVANCED DIGIT DRESSING" filed on Feb. 19, 2019, which are both hereby incorporated herein by reference in their entireties.

BACKGROUND

The present disclosure relates generally to the field of dressings for wound treatment, and in particular for treatment of wounds on digits (e.g., fingers, toes). Because of the shape, use, and articulation of digits, traditional bandages may not be well suited for treatment of wounds on digits. Furthermore, currently-available dressings designed specifically for use on digits do not provide advanced therapeutic features that may be available in other types of dressings. Accordingly, dressings are needed that provide various therapeutic features while also being configured for easy, comfortable, and effective use on digits.

SUMMARY

One implementation of the present disclosure is a dressing for treating a wound on a digit having two or more layers. The dressing includes a digit contact layer configured to substantially prevent adherence of the dressing to the wound and an antimicrobial layer coupled to a wound-facing side of the digit contact layer. The antimicrobial layer includes an antimicrobial substance. A first roll is coupled to a non-wound-facing side of the digit contact layer and unrollable to cover the digit, the digit contact layer, and the antimicrobial layer and a second roll is coupled to the first roll and unrollable to cover the first roll, the digit, the digit contact layer, and the antimicrobial layer.

In some embodiments, a film barrier is positioned between the antimicrobial layer and the wound-facing side of the digit contact layer. The film barrier is configured to substantially prevent the flow of the antimicrobial substance therethrough from the antimicrobial layer to the digit contact layer.

In some embodiments, the second roll includes a fluid-resistant material configured to substantially prevent at least one of ingress of fluid to the dressing or egress of fluid from the dressing.

In some embodiments, the dressing includes an absorbent layer positioned between the digit contact layer and the first roll. The second roll may include a fluid-resistant material configured to substantially prevent ingress of fluid to the dressing.

In some embodiments, the first roll includes an absorbent material. The second roll may include a fluid-resistant material configured to substantially prevent ingress of fluid to the dressing.

In some embodiments, the antimicrobial substance includes povidone-iodine and the antimicrobial layer includes gelatin.

Another implementation of the present disclosure is a dressing for treating a wound on a digit. The dressing includes a digit contact layer configured to substantially prevent adherence of the dressing to the wound, an absorbent layer coupled to a non-wound-facing side of the digit contact layer, a first roll coupled to the absorbent layer and unrollable to cover the digit, the digit contact layer, and the absorbent layer, and a second roll coupled to the first roll and unrollable to cover the first roll, the digit, the digit contact layer, and the absorbent layer. The second roll includes a fluid-resistant material configured to substantially prevent the ingress of fluid into the dressing.

In some embodiments, the digit contact layer includes an antimicrobial substance. In some embodiments, the antimicrobial substance includes povidone-iodine.

In some embodiments, the dressing includes an antimicrobial layer coupled to a wound-facing side of the digit contact layer. The dressing may include a film barrier positioned between the antimicrobial layer and the digit contact layer. The film barrier is configured to substantially prevent an antimicrobial agent from flowing therethrough from the antimicrobial layer to the absorbent layer.

In some embodiments, the digit contact layer encloses the absorbent layer.

The first roll and the second roll form a tube of elasticated cotton. The second roll is coated or laminated with a hydrophobic material.

Another implementation of the present disclosure is a method for manufacturing a dressing for treating a wound on a digit. The method includes providing a laminate material that includes a superabsorbent layer, forming the laminate material in a trapezoidal shape having a bottom, a top shorter than the bottom, a first angled side, and a second angled side, adhering the first angled side to the second angled side, adhering the laminate material to itself proximate the top to create a substantially conical form, rolling the laminate material from the bottom towards the top to form a bob, and coupling the bob to a wound contact layer.

In some embodiments, the laminate material includes a high moisture vapor transfer rate layer. The laminate material includes a polyurethane film layer. The bob is coupled to the wound contact layer proximate the top, and is unrollable to cover the wound contact layer, the wound, and the digit with the laminate material and provide a compressive force that holds the dressing on the digit.

Another implementation of the present disclosure is a dressing for treating a wound on a digit. The dressing includes a digit contact layer configured to substantially prevent adherence of the dressing to the wound, an antimicrobial layer coupled to a wound-facing side of the digit contact layer and including an antimicrobial substance, an absorbent first roll coupled to a non-wound-facing side of the digit contact layer and unrollable to cover the digit, the digit contact layer, the antimicrobial layer, and the film barrier, and a fluid-resistant second roll coupled to the first roll and unrollable to cover the absorbent first roll, the digit, the digit contact layer, and the antimicrobial layer.

In some embodiments, the dressing includes a film barrier positioned between the antimicrobial layer and the wound-facing side of the digit contact layer. The film barrier is configured to substantially prevent the flow of the antimicrobial substance therethrough from the antimicrobial layer to the digit contact layer.

In some embodiments, the absorbent first roll includes a superabsorbent material.

In some embodiments, the antimicrobial substance is povidone-iodine.

In some embodiments, the antimicrobial layer is aligned with a center of the absorbent first roll.

In some embodiments, the antimicrobial layer is offset from a center of the absorbent first roll.

DETAILED DESCRIPTION

Figure 1:
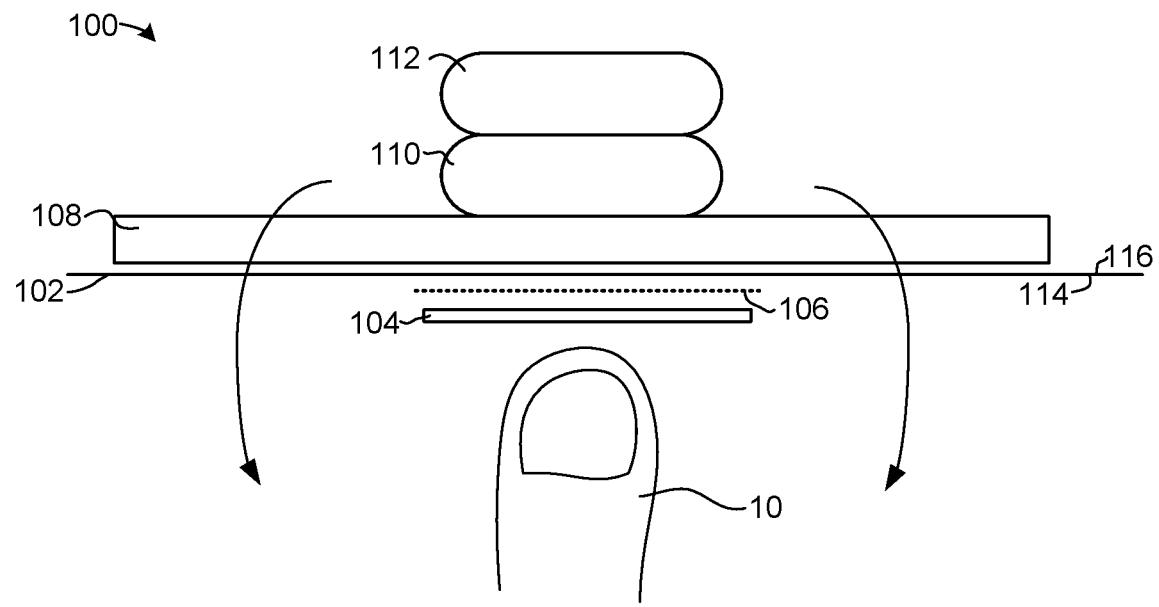
FIG. 1 is a side view of a first embodiment of a dressing for treating a wound on a digit, according to an exemplary embodiment.

Referring to FIG. 1, a side view of a first embodiment of a dressing 100 for treating a wound on a digit (e.g., finger 10) is shown, according to an exemplary embodiment. The dressing 100 is shown ready for application to a digit, and in an exploded view to illustrate the multiple layers of the dressing 100. The dressing 100 is configured to be applied to a digit (e.g., finger, toe) and to facilitate healing of a wound on the digit.

As shown in FIG. 1, the dressing 100 includes a digit contact layer 102 coupled to an antimicrobial layer 104, a film barrier 106, an absorbent layer 108, a first roll 110, and a second roll 112.

The digit contact layer 102 has a wound-facing side 114 opposite a non-wound-facing side 116. The digit contact layer 102 is flexible and conformable, and is thereby configured to be positioned at least partially abutting a digit (e.g., finger 10 shown in FIG. 1). The digit contact layer 102 may be configured to substantially prevent adherence of the dressing 100 to a wound on the finger 10. The digit contact layer 102 may include silicone and/or another non-adherent material.

In the embodiment shown in FIG. 1, the film barrier 106 and the antimicrobial layer 104 are coupled to the wound-facing side of the digit contact layer 102. The antimicrobial layer 104 is configured to contact a wound and reduce the risk of infection of the wound. For example, the antimicrobial layer 104 may include an antimicrobial substance that reduces the ability for bacteria, viruses, etc. to live, reproduce, etc. at the wound and/or in the dressing 100. For example, the antimicrobial layer 104 may include one or more of povidone-iodine (PVP-I), sliver, silver-ORC, polyhexanide (PHMB), chlorhexidine, honey, etc.

In some embodiments, the antimicrobial layer 104 is a non-adherent mesh impregnated with PVP-I that provides antimicrobial activity to a wound. In some embodiments, the antimicrobial layer 104 includes a PVP-I gelatin film which may provide a slow release of iodine to the wound. The PVP-I gelatin film may be generated by preparing a degassed slurry that contains 1%-5% w/v gelatin solids content, plasticizer (e.g., glycerol at 0.2%-10% v/v), and 5-20% PVP-I ointment. The slurry may be dehydrated to generate a conformable and flexible film sheet that forms the antimicrobial layer 104. In some embodiments, the antimicrobial layer 104 is a film of a bio-resorbable material (e.g., collagen, chitosan, elastin). In some embodiments, the antimicrobial layer 104 includes one or more of silicone, polyethylene, or polyurethane.

The film barrier 106 is positioned between the digit contact layer 102 and the antimicrobial layer 104. The film barrier 106 is configured to substantially prevent the antimicrobial substance of the antimicrobial layer 104 from passing therethrough to the digit contact layer 102. The film barrier 106 thereby directs the antimicrobial substance towards the wound where antimicrobial activity is desired, rather than into the dressing 100 where antimicrobial activity may be less desired. The film barrier 106 may be breathable, i.e., permeable to air. The film barrier 106 may be made of polyurethane and/or polyethylene.

The absorbent layer 108 is positioned on the non-wound-facing side of the digit contact layer 102. The absorbent layer 108 is configured to absorb fluid exuded from a wound on the finger 10. The absorbent layer 108 may include a polyurethane foam, a carboxymethylcellulose (CMC) fiber matrix, and/or a fiber matrix that includes polyacrylate in other inert fibers (e.g., polyethylene terephlalate). In some embodiments, the absorbent layer 108 includes a superabsorbent material such as polyacrylate. The absorbent layer 108 may be flexible, conformable, and/or extensible such that the absorbent layer 108 may be conformable around the finger 10 (or other digit).

The first roll 110 is coupled to the non-wound-facing side of the digit contact layer 102. The first roll 110 is unrollable (i.e., able to be unrolled from a rolled configuration) to cover the finger 10, the digit contact layer 102, the antimicrobial layer 104, the film barrier 106, and the absorbent layer 108. That is, when the first roll 110 is unrolled over the finger 10, the digit contact layer 102, the antimicrobial layer 104, the film barrier 106, and the absorbent layer 108 are positioned substantially between the first roll 110 and the finger 10.

The second roll 112 is coupled to the first roll 110. The second roll 112 is unrollable to cover the finger 10, the digit contact layer 102, the antimicrobial layer 104, the film barrier 106, the absorbent layer 108, and the first roll 110. That is, when the second roll 112 is unrolled over the finger 10, the digit contact layer 102, the antimicrobial layer 104, the film barrier 106, the absorbent layer 108, and the first roll 110 are positioned substantially between the second roll 112 and the finger 10.

In some embodiments, the first roll 110 and the second roll 112 are formed from a single tube. For example, a tube may be twisted near the middle to form a point, rolled from a first end towards the middle to form the first roll 110, and rolled from a second end towards the middle to form the second roll 112. In some embodiments, the first roll 110 and the second roll 112 are formed of an elasticated cotton material. When unrolled to cover the finger 10, the first roll 110 and/or the second roll 112 may provide a compressive force that holds the dressing 100 on the finger 10.

In some embodiments, the first roll 110 and/or the second roll 112 are configured to substantially prevent ingress of fluid to the dressing 100. In some embodiments, the second roll 112 may be made of a fluid-resistant material (e.g., polyisoprene, neoprene). In some embodiments, the second roll 112 may be laminated with a substantially waterproof film (e.g., polyurethane) or coated with a super-hydrophobic coating.

In such embodiments, the dressing 100 may be substantially waterproof. The dressing 100 may therefore be more resilient and longer-lasting in everyday use, for example allowing a patient to conduct general hygiene activities without negatively affecting the dressing 100. The dressing 100 may also thereby reduce the risk of maceration caused by external fluid. A waterproof second roll 112 and/or first roll 110 may also substantially prevent foreign contaminants from entering the dressing 100, reducing the risk of infection. A waterproof second roll 112 and/or first roll 110 may also substantially prevent egress of fluid from the dressing, which may improve the visual appearance and/or scent of the dressing 100.

In some embodiments, the first roll 110 and/or the second roll 112 may be configured to absorb fluid exuded by the wound. For example, the first roll 110 and/or the second roll 112 may be made of an elasticated cotton material with absorbent fibers (e.g., polyacrylate fibers) incorporated therein. As additional examples, the first roll 110 and/or the second roll 112 may be made of a polyurethane foam or CMC fibers.

Figure 2:
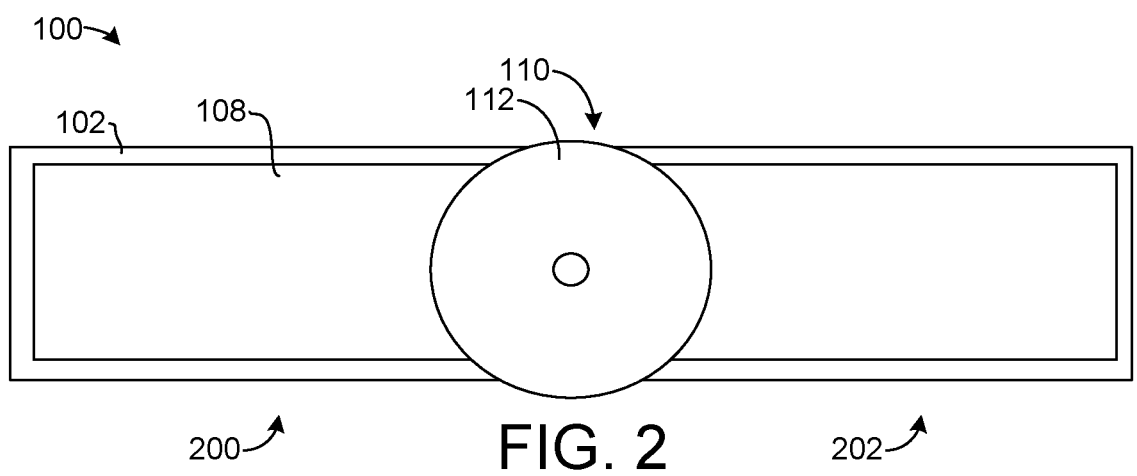
FIG. 2 is a top view of the dressing of FIG. 1, according to an exemplary embodiment.

Referring now to FIG. 2, a top view of the dressing 100 is shown in a pre-application configuration. In the embodiment shown, the absorbent layer 108 is substantially coextensive with (e.g., slightly smaller than) the digit contact layer 102. In other embodiments, the absorbent layer 108 may have an area significantly smaller than an area of the digit contact layer 102. The first roll 110 and the second roll 112 are positioned substantially centrally along the digit contact layer 102 and the absorbent layer 108. The absorbent layer 108 and the digit contact layer 102 are thereby divided by the first roll 110 and the second roll 112 into a first panel 200 and a second panel 202.

Referring to FIGS. 1 and 2, in order to apply the dressing 100 to a digit (e.g., to finger 10), the first roll 110 and the second roll 112 are positioned proximate a tip of the digit, with the wound-facing-side 114 of the digit contact layer 102 facing the digit. The antimicrobial layer 104 is put in contact with the digit, and the first panel 200 and the second panel 202 are folded towards the digit to conform to the digit. In preferred embodiments, the first panel 200 and the second panel 202 have widths such that a substantially complete circumference of the digit is covered by the combination of the first panel 200 and the second panel 202. The first roll 110 may then be unrolled over the digit 10, the first panel 200, and the second panel 202, and the second roll 112 may be unrolled over the first roll 110.

Referring now to FIGS. 3-9, side views of a variety of alternative embodiments of the dressing 100 are shown. It should be understood that the various layers of the dressing 100 may be made of various materials in various embodiments as described with reference to FIGS. 1-2 and/or as described below. For the sake of brevity and clarity, a limited number of embodiments are shown and described herein. However, it should be understood that all possible combinations of the various layers and materials thereof described herein are within the scope of the present disclosure.

Figure 3:
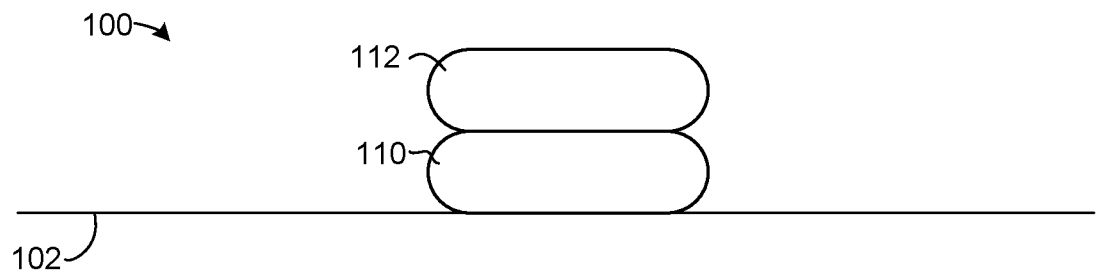
FIG. 3 is a side view of a second embodiment of a dressing for treating a wound on a digit, according to an exemplary embodiment.

As shown in FIG. 3, the dressing 100 may include a digit contact layer 102 coupled to a first roll 110 and a second roll 112. In some embodiments, the digit contact layer 102 may include an antimicrobial substance. For example, the digit contact layer 102 may include a knitted viscose fabric impregnated with a polyethylene glycol base containing 10% PVP-I (e.g., 1% available iodine). As another example, the digit contact layer 102 may include silver fibers, PHMB, and/or charcoal fibers. In some embodiments, the first roll 110 includes an absorbent material, for example incorporated within an elasticated cotton material. In some embodiments, the second roll 112 is substantially waterproof. Accordingly, the dressing 100 of FIG. 3 may be configured to provide antimicrobial activity, absorption, and waterproofing with three layers.

Figure 4:
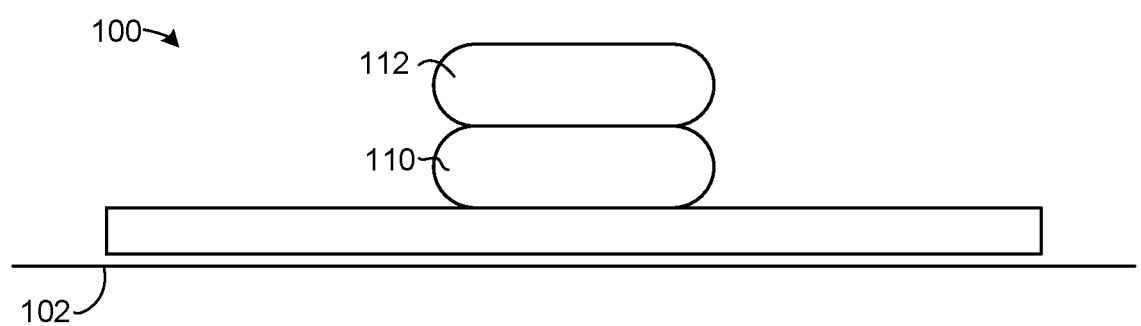
FIG. 4 is a side view of a third embodiment of a dressing for treating a wound on a digit, according to an exemplary embodiment.
Figure 5:
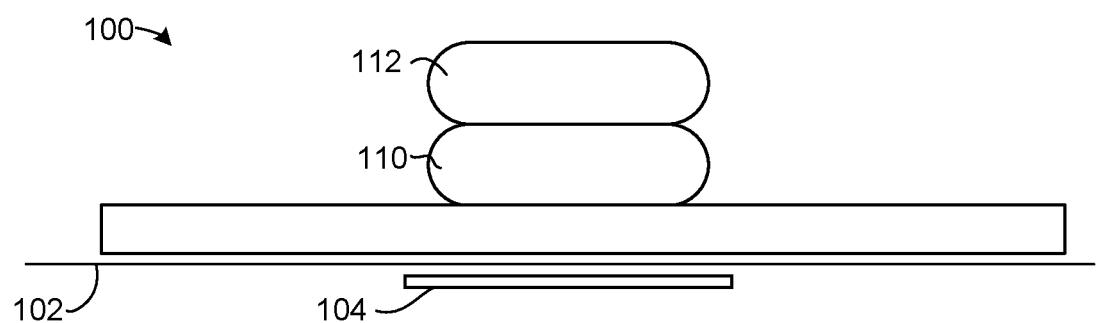
FIG. 5 is a side view of a fourth embodiment of a dressing for treating a wound on a digit, according to an exemplary embodiment.
Figure 6:
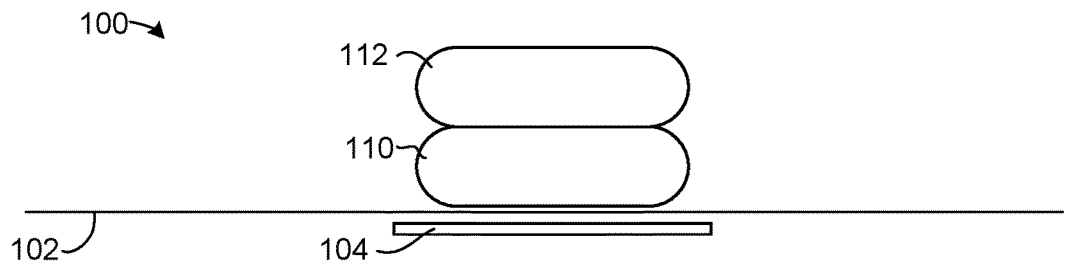
FIG. 6 is a side view of a fifth embodiment of a dressing for treating a wound on a digit, according to an exemplary embodiment.
Figure 7:
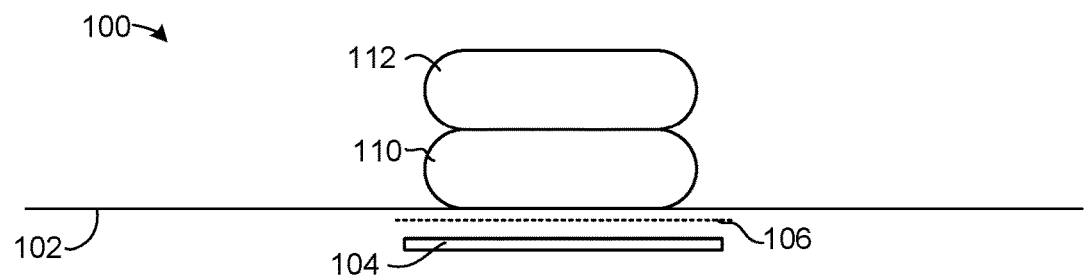
FIG. 7 is a side view of a sixth embodiment of a dressing for treating a wound on a digit, according to an exemplary embodiment.
Figure 8:
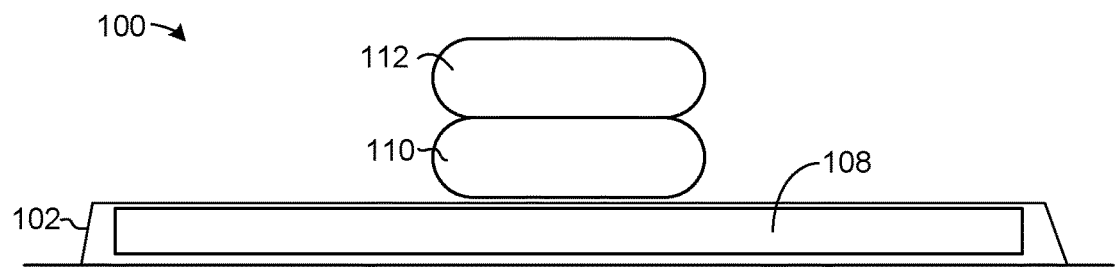
FIG. 8 is a side view of a seventh embodiment of a dressing for treating a wound on a digit, according to an exemplary embodiment.

As shown in FIG. 4, the dressing 100 may include a digit contact layer 102 coupled to an absorbent layer 108, a first roll 110 and a second roll 112 (i.e., without the antimicrobial layer 104 and film barrier 106). As shown in FIG. 5, the dressing 100 may include a digit contact layer 102 coupled to an absorbent layer 108, a first roll 110, and a second roll 112, and directly coupled to an antimicrobial layer 104 (i.e., without the film barrier 106). As shown in FIG. 6, the dressing 100 may include a digit contact layer 102 coupled to a first roll 110, a second roll 112, and an antimicrobial layer 104 (i.e., without the film barrier 106 or the absorbent layer 108). As shown in FIG. 7, the dressing 100 may include a digit contact layer 102 coupled to a first roll 110, a second roll 112, an antimicrobial layer 104, and a film barrier 106 (i.e., without the absorbent layer 108). As shown in FIG. 8, the absorbent layer 108 is enclosed within a pocket formed by the digit contact layer 102.

FIGS. 1 and 5-7 show the antimicrobial layer 104 substantially aligned with the first roll 110 and the second roll 112. In FIGS. 1 and 7, the film barrier 106 is also aligned with the first roll 110 and the second roll 112. In the embodiments shown, the antimicrobial layer 104 and the film barrier 106 have areas smaller than the area of the digit contact layer 102, such that the antimicrobial substance is directed to a limited portion of the digit. That is, when the antimicrobial layer 104 is aligned with the first roll 110 and the second roll 112, the dressing 100 is configured to apply the antimicrobial substance to a tip of the digit, for example to treat an infected fingernail or toenail or other wound at the tip of the digit.

Figure 9:
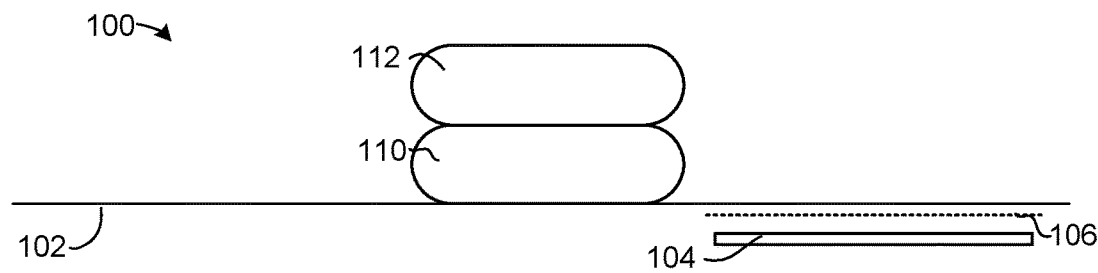
FIG. 9 is a side view of an eighth embodiment of a dressing for treating a wound on a digit, according to an exemplary embodiment.

As shown in FIG. 9, the antimicrobial layer 104 and the film barrier 106 are offset from a center of the dressing 100 (i.e., offset from a center of the first roll 110 and a center of the second roll 112). In such a case, the dressing 100 is configured to allow the antimicrobial layer 104 (and the antimicrobial activity associated therewith) to be applied to a wound positioned on a side of the digit.

Figure 10:
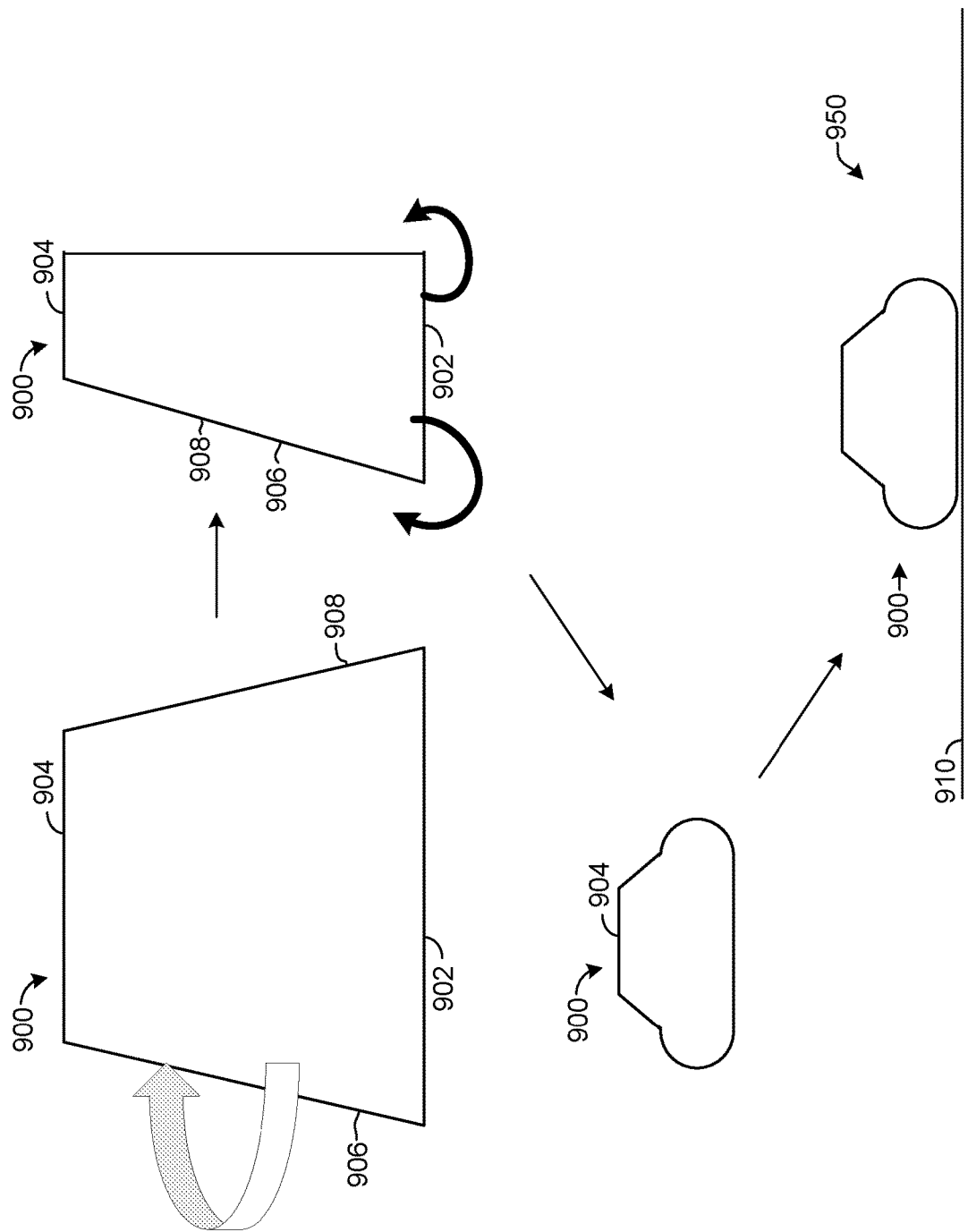
FIG. 10 is an illustration of a process for manufacturing an eighth embodiment of a dressing for treating a wound on a digit, according to an exemplary embodiment.

Referring now to FIG. 10, an illustration of a method of manufacturing a digit dressing 950 is shown, according to an exemplary embodiment. The digit dressing 950 includes a superabsorbent laminate 900 coupled to a digit contact layer 910. The digit contact layer 910 may be made of substantially the same materials as described above for the digit contact layer 102 in various embodiments.

The superabsorbent laminate 900 may include a polyurethane digit contact film layer, a non-woven superabsorbent material, and a high moisture vapor transfer rate polyurethane film layer laminated together in a single sheet of laminate material. The superabsorbent laminate 900 may facilitate absorption of fluid from a wound to a superabsorbent material and evaporation of the fluid from the superabsorbent material to the environment through the high moisture vapor transfer rate polyurethane layer. The superabsorbent laminate 900 may be positionable on a digit to cover the digit contact layer 910, the digit, and a wound on the digit. The superabsorbent laminate 900 may be configured to provide a compressive force that holds the digit dressing 950 on the digit.

As illustrated by FIG. 10, the digit dressing 950 may be manufactured by first forming the superabsorbent laminate 900 in a trapezoidal shape that has a bottom 902, a top 904, a first angled side 906, and a second angled side 908. The superabsorbent laminate 900 may then be folded substantially in half, aligning the first angled side 906 with the second angled side 908. The first angled side 906 may be adhered to the second angled side 908, and the superabsorbent laminate 900 may be adhered to itself proximate the top 904. The superabsorbent laminate 900 may thereby be configured in a substantially conical form.

As illustrated by FIG. 10, the substantially-conical superabsorbent laminate 900 may then be rolled outwardly from the bottom 902 towards the top 904 to form a bob (i.e., a roll of the superabsorbent laminate 900). The bob (i.e., the superabsorbent laminate 900) may then be coupled to the digit contact layer 910, for example adhered or fused to the digit contact layer 910 proximate the top 904. A dressing 950 is thereby formed that may be easily and intuitively applied to a digit.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. All such variations are within the scope of the disclosure.

What is claimed is:

1. A dressing for treating a wound on a digit, comprising:
    a digit contact layer configured to substantially prevent adherence of the dressing to the wound, wherein a portion of the digit contact layer defines an enclosure on a non-wound-facing side of the digit contact layer, the enclosure being defined independently from any contact between the digit contact layer and the digit;
    an absorbent enclosed within the enclosure and configured to absorb fluid from the wound through the digit contact layer;
    an antimicrobial layer coupled to a wound-facing side of the digit contact layer, the antimicrobial layer comprising an antimicrobial substance;
    a first roll coupled to the enclosure on the non-wound-facing side of the digit contact layer and unrollable to cover the digit, the digit contact layer, the enclosure, and the antimicrobial layer; and
    a second roll coupled to the first roll and unrollable to cover the first roll, the digit, the digit contact layer, the enclosure, and the antimicrobial layer.

2. The dressing of claim 1, comprising a film barrier positioned between the antimicrobial layer and the wound-facing side of the digit contact layer, the film barrier configured to substantially prevent the flow of the antimicrobial substance therethrough from the antimicrobial layer to the digit contact layer.

3. The dressing of claim 1, wherein the second roll comprises a fluid-resistant material configured to substantially prevent at least one of ingress of fluid to the dressing or egress of fluid from the dressing.

4. The dressing of claim 1, wherein the absorbent comprises an absorbent layer positioned between the non-wound-facing side of the digit contact layer and the first roll.

5. The dressing of claim 4, wherein the second roll comprises a fluid-resistant material configured to substantially prevent ingress of fluid to the dressing.

6. The dressing of claim 1, wherein the first roll comprises absorbent fibers.

7. The dressing of claim 6, wherein the second roll comprises a fluid-resistant material configured to substantially prevent ingress of fluid to the dressing.

8. The dressing of claim 1, wherein at least one of the first roll or the second roll is configured to provide a compressive force that holds the dressing on the digit.

9. The dressing of claim 1, wherein the antimicrobial substance comprises povidone-iodine and wherein the antimicrobial layer comprises gelatin.

10. A dressing for treating a wound on a digit, comprising:
    a digit contact layer configured to substantially prevent adherence of the dressing to the wound, wherein a portion of the digit contact layer defines an enclosure on a non-wound-facing side of the digit contact layer, the enclosure being defined independently from any contact between the digit contact layer and the digit;

an absorbent layer coupled to the non-wound-facing side of the digit contact layer and enclosed within the enclosure;

a first roll coupled to the enclosure and unrollable to cover the digit, the digit contact layer, the enclosure, and the absorbent layer; and a second roll coupled to the first roll and unrollable to cover the first roll, the digit, the digit contact layer, the enclosure, and the absorbent layer;

wherein the second roll comprises a fluid-resistant material configured to substantially prevent the ingress of fluid into the dressing.

11. The dressing of claim 10, wherein the digit contact layer comprises an antimicrobial substance.

12. The dressing of claim 11, wherein the antimicrobial substance comprises povidone-iodine.

13. The dressing of claim 10, comprising an antimicrobial layer coupled to a wound-facing side of the digit contact layer.

14. The dressing of claim 13, comprising a film barrier positioned between the antimicrobial layer and the digit contact layer;

wherein the film barrier is configured to substantially prevent an antimicrobial agent from flowing therethrough from the antimicrobial layer to the absorbent layer.

15. The dressing of claim 10, wherein the first roll and the second roll form a tube of elasticated cotton, and wherein the second roll is coated or laminated with a hydrophobic material.

* * * * *